United States Patent [19]

Yamanaka

[11] 3,726,996

[45] Apr. 10, 1973

[54] PATTERN RECORDING SYSTEM

[75] Inventor: Ritsuzo Yamanaka, Hino-shi, Tokyo, Japan

[73] Assignee: Iwasaki Tsushinki Kabushiki Kaisha, a/k/a Iwatsu Electric Co., Ltd., Tokyo-to, Japan

[22] Filed: Feb. 24, 1971

[21] Appl. No.: 118,254

[30] Foreign Application Priority Data

Feb. 27, 1970 Japan ................................45/16210

[52] U.S. Cl. ...................178/6.7 R, 178/15, 346/110

[51] Int. Cl. ............................................G01d 9/38

[58] Field of Search ........................178/6.7 A, 6.7 R, 178/15; 346/110

[56] References Cited

UNITED STATES PATENTS

| | | | |
|---|---|---|---|
| 3,555,177 | 1/1971 | Tyler | 178/6.7 A |
| 3,590,150 | 6/1971 | McMahon | 178/6.7 R |
| 3,482,255 | 12/1969 | Baker | 346/110 |

*Primary Examiner*—Howard W. Britton
*Attorney*—Robert E. Burns and Emmanuel J. Lobato

[57] ABSTRACT

A recording system for recording an image pattern indicated by an X-signal and a Y-signal of a rectangular coordinate system comprises an optical fiber tube for displaying said image pattern having a substantially rectangular display screen. One side of the display screen side is more than a corresponding side of a substantially rectangular area which just includes the image pattern and the other side is less than another side of said substantially rectangular area. The image pattern displayed on the substantially rectangular display screen is shifted along the direction of the other side of the display screen by the use of a feeding signal, such as a saw-tooth wave, having a period substantially equal to or more than $n$-times the period of the set of the X-signal and Y-signal, where $n$ is an integer obtained by dividing the corresponding side of said substantially rectangular area by the length of the other side of said substantially rectangular display screen. The print paper travels along the shift direction of the image pattern in synchronism with the shift speed of the image pattern.

8 Claims, 3 Drawing Figures

PATTERN RECORDING SYSTEM

This invention relates to pattern recording systems and, more particularly, to a pattern recording system for recording on a record medium such as a record paper, a pattern displayed on a display screen such as an optical fiber tube by the use of signals of a rectangular coordinate system.

In recording an image pattern by the use of an optical fiber tube in conventional techniques, the image pattern can be recorded as a picture signal similar to a facsimilie signal obtained by sequentially scanning the image pattern, or as a line pattern similar to a raster. However, since graphic display using a computer is performed by random scanning, and since it is very difficult to convert a picture signal obtained by the above-mentioned random scanning to a picture signal similar to the facsimile signal or the line pattern, the recording of a graphic display pattern cannot be readily performed in conventional techniques.

An object of this invention is to provide a pattern recording system capable of readily recording a pattern displayed by random scanning on a display screen, such as an optical fiber tube.

In the system of this invention, display means such as an optical fiber tube has a substantially rectangular display screen having one side longer than a corresponding side of a substantially rectangular area which just includes therein the image pattern and having another side shorter than another side of said substantially rectangular area. The image pattern displayed on the substantially rectangular display screen is shifted along the direction of the other side of the display screen by the use of a feed signal, such as a saw-tooth wave, the period of which is substantially equal to or more than $n$-times the period of the set of a first signal (e.g., one of a X-signal and a Y-signal of a rectangular coordinate) and a second signal (e.g.; the other of the X-signal and the Y-signal) of a rectangular coordinate indicative of the image pattern. In this case $n$ is an integer obtained by dividing the corresponding side of said substantially rectangular area by the length of the other side of said substantially rectangular display screen. An elongated flat record medium, such as a print paper, travels along the shift direction of the image pattern in synchronism with the shift speed of the image pattern. In accordance with the above principle, the image pattern displayed on the screen of the display means can be recorded on the record medium in a high recording speed.

The principle, construction and operation of the system of this invention will be better understood from the following more detailed discussion in conjunction with the accompanying drawings, in which.

Figure 1:
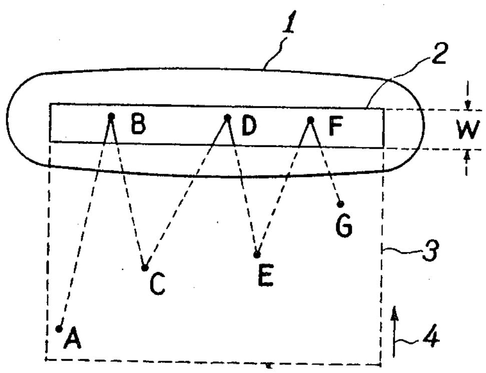
FIG. 1 is a schematic elevation of an optical fiber tube explanatory of the principle of this invention.
Figure 2:
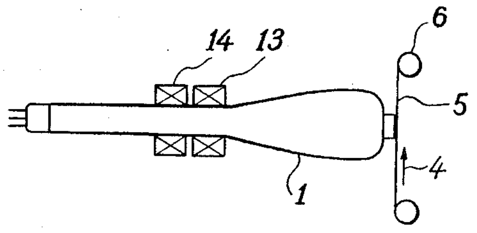
FIG. 2 is a schematic side view of an optical fiber tube employed in the system of this invention.

With reference to FIGS. 1 and 2, the principle of this invention will first be described. An upper part of an image pattern to be recorded is displayed in a window 2 of an optical fiber tube 1 as shown in FIG. 1. In other words, if the image pattern is a folded-line pattern A–B–C–BD–E–F–G displayed on an imaginary screen 3, including the window 2, only an upper part including folded points B, D and F is initially displayed in the window 2. Thereafter, the image pattern A–B–C–D–E–F–G is shifted to the upper direction shown by an arrow 4 so as to successively display lower parts of the image pattern A–B–C–D–E–F–G.

On the other hand, a record paper 5 guided between reels 6 travels in the upper direction shown by the arrow 4 as shown in FIG. 2 in synchronism with the shifting speed of the image pattern A–B–C–D–E–F–G on the imaginary screen 3. Drive of the reels 6 is performed by suitable drive means, such as an electronic motor control. Shift of the image pattern A–B–C–D–E–F–G is performed by the use of a set of deflecting coils 13 (i.e.; 13*a* and 13*b*) as mentioned below. A focusing coil 14 focuses the image patterns on the display screen. In accordance with the above principle, the image pattern (e.g.; A–B–C–D–E–F–G) on the imaginary screen 3 can be recorded on the record paper 5 without aberration.

The width W of the window 2 of the optical fiber tube 1 may be theoretically quite narrow. In this case, the shifting speed of the print paper 5 is necessarily low. Accordingly, it is desirable in an actual device that the width W of the window 2 be as wide as possible.

Since the image pattern (A–B–C–D–E–F–G) is displayed by random scanning as mentioned above, an upper limit of the record speed in this system can be determined in consideration of the fact that the image pattern must be displayed at least once during a time in which the record paper 5 travels by the width $W$. If a maximum travelling speed of the record paper 5 is assumed as a value $V_{max}$, and if a displayed-frame rate of the optical fiber tube is assumed as $f$ frames/second, the following relationship is satisfied:

$$V_{max} = W/(1/f) \qquad (1)$$

By way of example, if the values $f$ and $W$ are assumed, respectively, as 40 and 10 millimeters, the maximum travelling speed $V_{max}$ is equal to 400 millimeters/second from the above equation (1). Since the longitudinal length of an image pattern to be recorded is usually less than 300 millimeters, the image pattern can be recorded in a high speed less than a record rate of one pattern/second.

Figure 3:
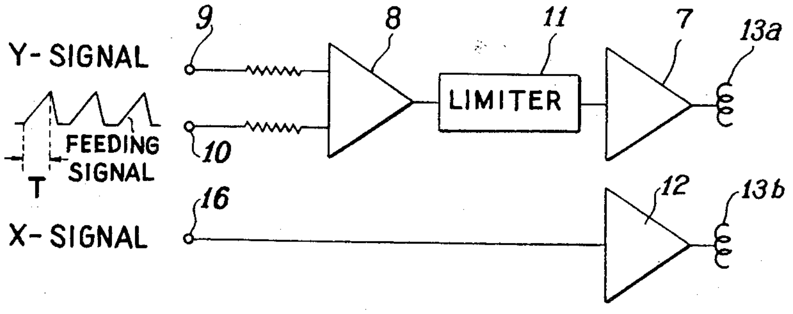
FIG. 3 is a block diagram illustrating an example of control circuitry employed in the system of this invention.

An example of means for shifting the image pattern in the upward direction is shown in FIG. 3. In this example, combining means comprising an operational amplifier 8 having a pair of input terminals 9 and 10 is provided before a Y-deflecting amplifier 7, which is employed for driving a Y-deflecting coil 13*a* of the optical fiber tube 1. A Y-signal generated in a conventional manner for graphic display is applied to the terminal 9, while a feeding or control signal (e.g.; a saw-tooth wave) is applied to the control terminal 10. In this case, a period T of the feeding signal corresponds to a shift time necessary to shift the image pattern on the imaginary screen 3, and is determined so as to suit or match the feeding speed of the print paper 5.

In other words, if the image pattern has a length, along the direction of the arrow 4, which is substantially equal to 10 times the width $W$ of the window 2, 10 periods of the sets of the X-signal and the Y-signal are included in the period T. A limiter 11 provided between the operational amplifier 8 and the Y-deflecting amplifier 7 is not essential means. However, insertion of the limiter 11 is advantageous to obtain therefrom a picture signal, which is exactly displayed within the width *W* of the window 2 of the optical fiber tube 1. An X-signal generated in a conventional manner is applied from a terminal 16 and is amplified in a X-deflecting amplifier 12 and drives a X-deflecting coil 13*b* of the optical fiber tube 1.

In the above example, other elongated flat record medium (e.g.; a roll film) may be also employed instead of the print paper 5.

If a long image pattern extending in the transverse direction is to be recorded, the image pattern is shifted in the transverse direction (i.e., the X-direction). In this case, the feeding signal is combined with the X-signal. For this purpose, the example shown in FIG. 3 is modified as follows:

(1) To the operational amplifier 8, the feeding signal and the X-signal is applied. (2) The output of the limiter 11 is applied to the X-deflecting amplifier 12. (3) The Y-signal is directly applied to the Y-deflecting amplifier 7.

What I claim is:

1. A recording system for recording an image pattern represented by a first signal and a second signal of a rectangular coordinate system comprising: a first terminal for receiving a first signal; a second terminal for receiving a second signal; display means having a substantially rectangular display screen having one side longer than a corresponding side of a substantially rectangular area which just includes therein the image pattern and another side shorter than the other side of said substantially rectangular area and including means for generating a deflectable displaying beam coacting with said display screen to produce an image thereon; first deflectingmeans coupled between said first terminal and said display means for deflecting the displaying beam of said display means in accordance with the first signal in the direction of said one side of said substantially rectangular display screen; a control terminal for receiving a feeding signal whose instantaneous voltage periodically varies in a unidirectional constant rate within a level range and having a period substantially equal to or more than *n*-times the period of the set of said first and second signals, where *n* is an integer obtained by dividing the corresponding side of said substantially rectangular area by the length of the other side of said substantially rectangular display screen; combining means coupled to said second terminal and said control termain for producing a difference signal between the second signal and the feeding signal; second deflecting means coupled between the output of said combining means and said display means for deflecting the displaying beam of said display means in the direction of the other side of said substantially rectangular display screen in accordance with said difference signal; an elongated flat record medium; guide means for guiding said elongated flat record medium along a guide path extending in opposed facing relationship across the face of the substantially rectangular display screen in the direction of the other side of the substantially rectangular display screen; and drive means coupled to said guide means for driving the guide means so as to shift the elongated flat record medium along the guide path at a unidirectional constant speed synchronized with the shift speed of the image pattern caused by the period of the feed signal.

2. A recording system according to claim 1, further comprising a limiter connected between said combining means and said second deflecting means for limiting a peak value of the output of said combining means so as to exactly match the other side of the display screen.

3. A recording system according to claim 1, in which said display means comprises an optical fiber tube.

4. A recording system according to claim 1, in which said combining means comprises an operational amplifier.

5. A recording system according to claim 1, in which said feeding signal is a saw-tooth signal.

6. A recording system for recording a complete image pattern of a function represented in a rectangular coordinate system by an X-signal and Y-signal comprising: display means including a display screen and responsive to an X-signal and a Y-signal representative of a function to be recorded for successively and luminously displaying at a predetermined display rate on said display screen successive incremental portions of the complete image pattern of the function; a light-sensitive record medium on which the image patten is to be recorded; and advancing means for advancing said record medium past said display screen in opposed facing relationship thereto at an advancing rate synchronized with said display rate to effect successive recording of said successive incremental portions of said image pattern on said record medium.

7. A recording system according to claim 6; wherein said display means comprises means for generating an electron beam coacting with said display screen to provide a luminous output, sweep means for periodically sweeping the electron beam along one of the X and Y axes of said display screen in accordance with one of said X and Y signals, means for time-dividing the other of said X and Y signals into *n* successive signals, and deflecting means for periodically deflecting the electron beam along the other of said X and Y axes in accordance with successive ones of said *n* successive signals in time periods each synchronized with one sweep period of said sweep means.

8. A recording system according to claim 7; wherein said means for time-dividing the other of said X and Y signals includes an operational amplifier receptive of both the other of said X and Y signals and a control signal for developing therefrom said *n* successive signals.

* * * * *